F. M. TUCKER.
MACHINE FOR SHAPING DRILLS.
APPLICATION FILED DEC. 2, 1909.
974,211.
Patented Nov. 1, 1910.
2 SHEETS—SHEET 1.
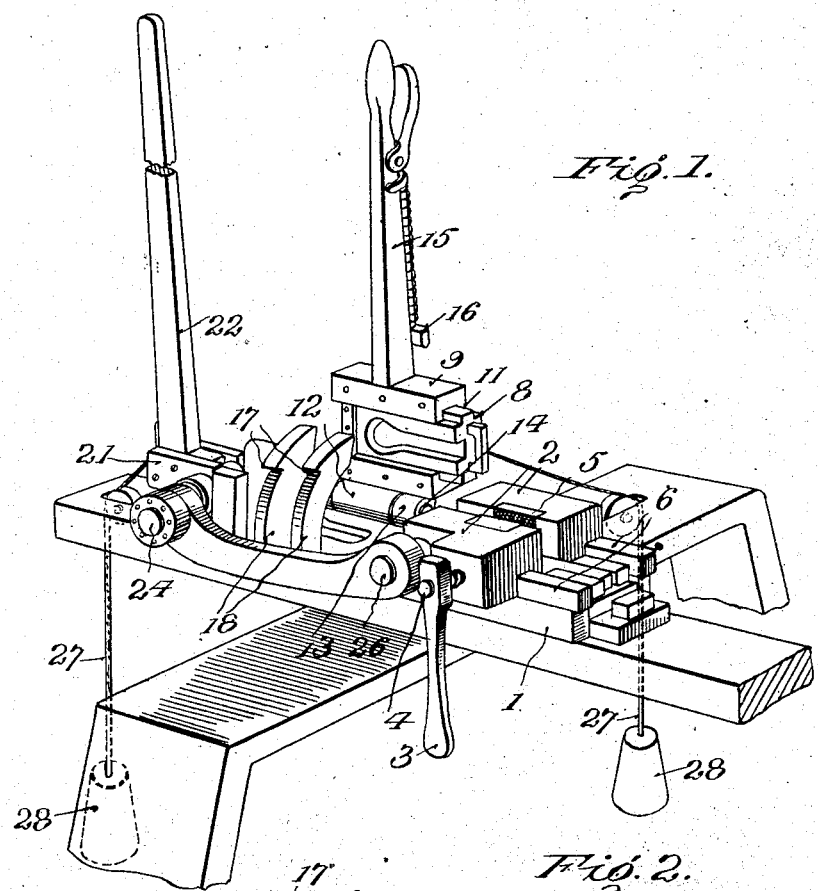
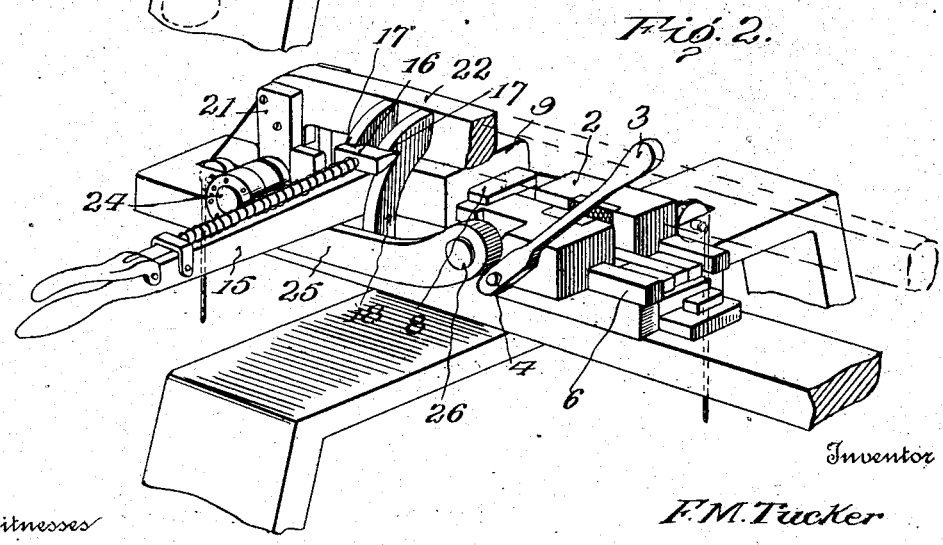
Witnesses
Inventor
F. M. Tucker
By Van Racey, Attorneys.

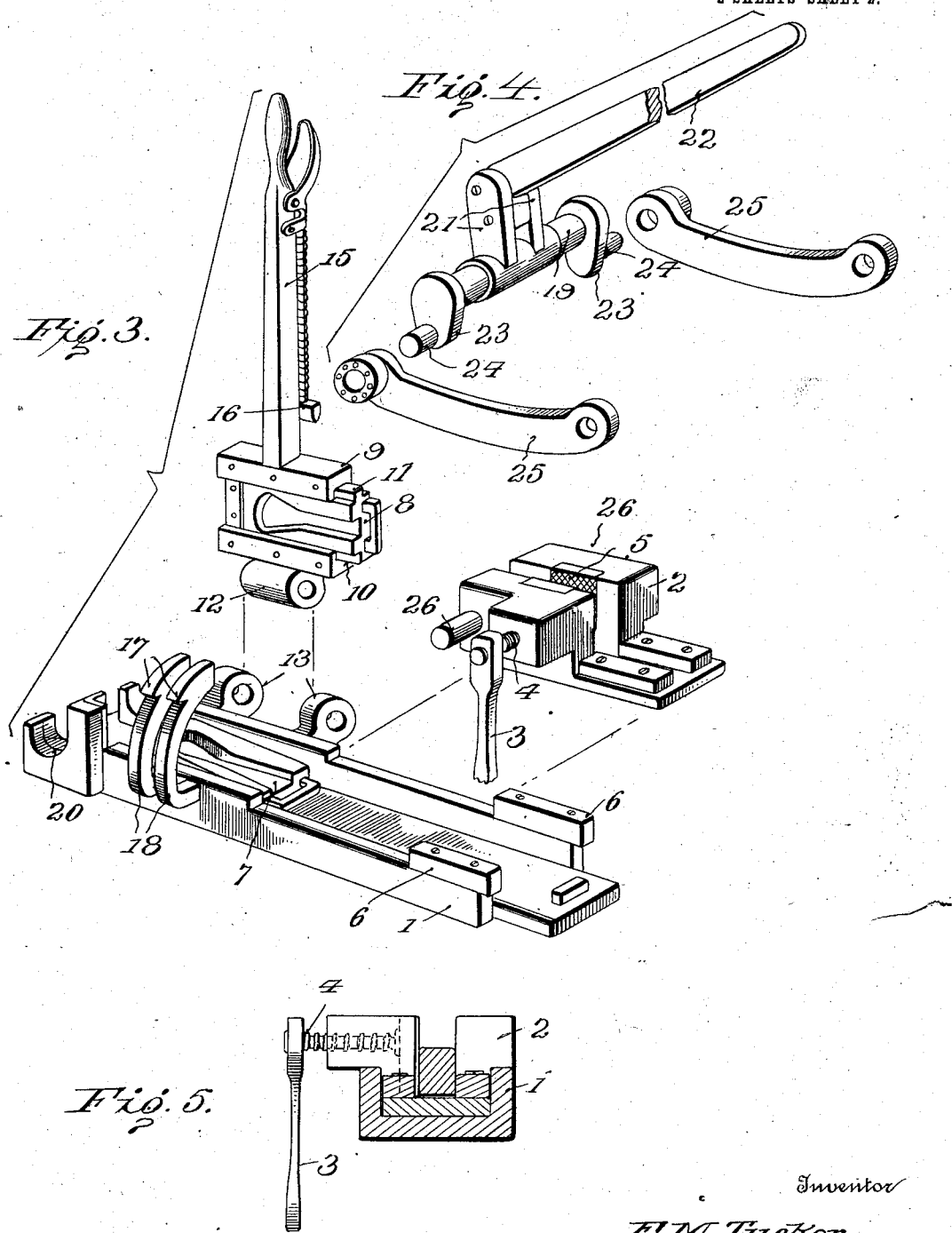

UNITED STATES PATENT OFFICE.

FRANCOIS M. TUCKER, OF FREDERICKTOWN, MISSOURI, ASSIGNOR OF ONE-HALF TO ELIZA TURNBEAUGH, OF FREDERICKTOWN, MISSOURI.

MACHINE FOR SHAPING DRILLS.

974,211.

Specification of Letters Patent.   Patented Nov. 1, 1910.

Application filed December 2, 1909. Serial No. 531,005.

*To all whom it may concern:*

Be it known that I, FRANCOIS M. TUCKER, a citizen of the United States, residing at Fredericktown, in the county of Madison and State of Missouri, have invented certain new and useful Improvements in Machines for Shaping Drills, of which the following is a specification.

The object of this invention is a simple and efficient construction of apparatus for sharpening or shaping drills and other tools, and the invention consists essentially in a machine of this character embodying a die, a tool holder arranged to hold a tool within the die, means for pressing the die sections together, whereby to compress and shape the end of the tool, and means whereby the tool holder will be pressed toward the die during the compressing operation, whereby to insure that the tool will be firmly held in place and properly shaped or sharpened. And the invention also consists in certain constructions, arrangements and combinations of the parts that I shall hereinafter fully describe and claim.

For a full understanding of the invention, reference is to be had to the following description and accompanying drawings, in which:

Figure 1 is a perspective view of a drill sharpening apparatus constructed in accordance with my invention; Fig. 2 is a similar view, but with the parts closed and one part being broken away; Fig. 3 is a similar view of some of the actuating parts, shown detached and in juxtaposition to each other; Fig. 4 is a similar view of some other parts, hereinafter specifically referred to; and, Fig. 5 is a transverse sectional view through the tool holder.

Corresponding and like parts are referred to in the following description and indicated in all the views of the drawings by the same reference characters.

Referring to the drawings, the numeral 1 designates the bed or base of my improved tool shaping apparatus, the same being of any desired width and length and secured upon any desired bench, foundation or other support. Mounted upon the base 1 near one end thereof is a vise 2 embodying a relatively stationary jaw and a relatively movable jaw, said jaws being clamped upon the drill or other tool held between them by means of the operating handle 3 and ordinary threaded stem 4. Preferably, the work engaging faces of the jaws are roughened, as indicated at 5, so that they may securely grip the shank of the drill, and prevent any displacement thereof. The vise 2 is mounted for a limited longitudinal movement as a whole upon the base 1, normally resting against stop blocks 6 that are secured in any desired way to said base at one end of the latter.

7 designates the relatively stationary die member supported on the base 1, which latter is preferably channeled to receive it, as best illustrated in Fig. 3, said die member being mounted close to the tool holder or vise 2 and being formed with a die of any desired outline or configuration according to the work it is intended to perform.

8 designates the relatively movable die member which is preferably held by detachable connection in a die holder 9, said die holder being formed with channels 10 into which the side flanges 11 of the upper or movable die member may be slipped. (See Fig. 3.) The die holder 9 is formed with an apertured knuckle 12 adapted to fit in between pintle eyes 13 formed on one side of the base 1, a hinge pin or bolt 14 being passed through said eyes and knuckle so as to pivotally mount the die holder in a position which will permit it to swing laterally over and above the base 1 so as to carry the upper die member 8 down upon the lower die member 7.

A handle 15 is connected to the die holder 9 and a spring pressed detent 16 is carried by said handle and is designed for locking engagement with the hooked upper ends 17 of longitudinally spaced and upwardly projecting dogs 18 formed on or secured to the side of the base 1 opposite the eyes 13. As best illustrated in Fig. 2, the dogs 18 not only serve to lock the die holder 9 with its die member 8 down upon the lower die member 7, but also serve the function of guides for the handle 15, the said handle passing in between the dogs as it is swung over the base. A transversely extending shaft 19 is journaled in any desired way upon one end of the base 1, as in bearing openings 20, (Fig. 3) and a die pressing member 21 is secured to project perpendicularly from said shaft, a die pressing lever 22 being arranged to swing longitudinally over the base 1 so as to press down upon the die holder and thereby compress the tool which is held within the die. Preferably, this handle 22 is of relatively great length so as to obtain the desired leverage. It is to be particularly noted that the shaft 19 is provided at its ends with cranks 23, wrist pins 24 projecting outwardly from the respective cranks, and receiving upon them the apertured ends of links 25. The other ends of these links 25 are also apertured and are adapted to be slipped over pins 26 which project laterally from the vise 2.

From the foregoing description in connection with the accompanying drawings, the operation of my improved drill sharpening or shaping device will be apparent. In the practical use of the apparatus, the operator places the drill or other tools to be sharpened within the vise 2 and clamps the same upon the tool, the tool being manifestly laid upon the lower die member 7. With his left hand the operator will then grasp the handle 15 and swing the die holder 9 over and upon the base so as to carry the upper die member 8 down upon the lower die member, thereby closing the die upon the tool. He will then, preferably with his right hand, grasp the upstanding lever 22 and swing the same over to the right, bearing down upon the said lever so as to press the die members one tightly upon the other, and thereby shape the end of the tool, while at the same time this movement of the lever and the consequent partial rotation of the shaft 19 will effect, through the instrumentality of the cranks 23 and links 25, a slight drawing in of the vise toward the die so as to insure that the tool will be held properly as against any outward displacement. To open the apparatus after the drill has been sharpened, it is only necessary to swing the lever 22 and the handle 15 upwardly, in an obvious manner. Preferably, cables 27 are connected to the die holder 9 and part 21, weights 28 being suspended from the respective cables so as to assist in the operation of opening the apparatus.

It is to be understood that my invention is not limited to the exact construction and arrangement and proportions of the parts herein shown and described, but that various changes may be made without departing from the scope of the invention as defined in the appended claims.

Having thus described the invention, what is claimed as new is:

1. An apparatus of the character described, comprising a base, a tool-holder movably mounted on said base, die members supported by the base, a shaft journaled on the base and provided with cranks, means secured to said shaft for pressing the die members together upon a turning of the shaft and links connected to said cranks and to the tool-holder.

2. An apparatus of the character described comprising a base, a tool-holder movably mounted on said base, die members supported by the base a handle connected to one of said die members, means on the base arranged to engage said handle and lock the die members in closed relation to each other, a shaft journaled on the base and provided with cranks, a handle connected to said shaft, and adapted to be swung over upon the die members to press the same together and links connected to said cranks and to the tool-holder.

3. An apparatus of the character described, comprising a base, a tool holder mounted on said base and provided with laterally extending pins, die members supported by the base, a shaft journaled on the base and provided with cranks, means secured to said shaft for pressing the die members together upon a turning of the shaft, and links connected to said cranks and to the pins of the tool holder.

4. An apparatus of the character described, comprising a base, a die member mounted on said base, another die member, a laterally swinging die holder carrying said last named die member, a handle connected to said die holder, longitudinally spaced upwardly projecting dogs secured to the base and provided with hooked ends, the handle being adapted to swing across the base and in between said dogs, and a detent carried by said handle and adapted for engagement with said hooked ends.

5. An apparatus of the character described, comprising a base, a lower die member supported on said base, an upper die member, a die holder to which said upper die member is connected, said die holder being pivotally connected at one end to one side of the base and adapted to swing across the base so as to carry the upper die member down upon the lower die member, a handle projected from the die holder, a spring pressed detent carried by said handle, dogs projecting upwardly from the base at the side thereof opposite the hinged connection of the die holder with the base and designed for engagement by said detent whereby to lock the die in closed position, a transverse shaft journaled on the base and provided with cranks, a die pressing member projected from said shaft, an actuated lever secured to said die pressing member and adapted to swing longitudinally over and upon the base and into engagement with the die holder, and links mounted upon the said cranks and connected to the tool holder as and for the purpose set forth.

6. An apparatus of the character described, comprising a base, a tool-holder movably mounted on said base, a die member mounted on the base, another die member, a laterally swinging die-holder carrying said last named die member, a handle connected to said die-holder, means on the base for engaging said handle whereby to hold the die holder in closed position, a transversely extending shaft journaled on the base and provided with cranks, a handle secured to the shaft and adapted to swing longitudinally on the base and over and upon the die holder whereby to press the die members together, and links connected to said cranks and to the tool-holder.

In testimony whereof I affix my signature in presence of two witnesses.

FRANCOIS M. TUCKER. [L. S.]

Witnesses:
ELIZABETH DAY,
WALTER H. DAY.